United States Patent
Tobata et al.

(10) Patent No.: US 12,398,437 B2
(45) Date of Patent: Aug. 26, 2025

(54) HIGH-STRENGTH STEEL SHEET AND METHOD FOR MANUFACTURING THE SAME

(71) Applicant: JFE Steel Corporation, Tokyo (JP)

(72) Inventors: Junya Tobata, Tokyo (JP); Hidekazu Minami, Tokyo (JP); Takashi Kobayashi, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 848 days.

(21) Appl. No.: 17/295,950

(22) PCT Filed: Nov. 18, 2019

(86) PCT No.: PCT/JP2019/045019
§ 371 (c)(1),
(2) Date: May 21, 2021

(87) PCT Pub. No.: WO2020/110795
PCT Pub. Date: Jun. 4, 2020

(65) Prior Publication Data
US 2021/0310095 A1    Oct. 7, 2021

(30) Foreign Application Priority Data
Nov. 29, 2018  (JP) ................. 2018-224170

(51) Int. Cl.
| | |
|---|---|
| *C21D 9/46* | (2006.01) |
| *B32B 15/01* | (2006.01) |
| *C21D 1/18* | (2006.01) |
| *C21D 6/00* | (2006.01) |
| *C21D 8/02* | (2006.01) |
| *C22C 38/00* | (2006.01) |
| *C22C 38/02* | (2006.01) |
| *C22C 38/06* | (2006.01) |
| *C22C 38/08* | (2006.01) |
| *C22C 38/14* | (2006.01) |
| *C22C 38/16* | (2006.01) |
| *C22C 38/24* | (2006.01) |
| *C22C 38/26* | (2006.01) |
| *C22C 38/38* | (2006.01) |
| *C23C 2/02* | (2006.01) |
| *C23C 2/28* | (2006.01) |

(52) U.S. Cl.
CPC .............. *C21D 9/46* (2013.01); *B32B 15/013* (2013.01); *C21D 1/18* (2013.01); *C21D 6/001* (2013.01); *C21D 6/002* (2013.01); *C21D 6/005* (2013.01); *C21D 6/007* (2013.01); *C21D 6/008* (2013.01); *C21D 8/0205* (2013.01); *C21D 8/0226* (2013.01); *C21D 8/0236* (2013.01); *C22C 38/001* (2013.01); *C22C 38/002* (2013.01); *C22C 38/008* (2013.01); *C22C 38/02* (2013.01); *C22C 38/06* (2013.01); *C22C 38/08* (2013.01); *C22C 38/14* (2013.01); *C22C 38/16* (2013.01); *C22C 38/24* (2013.01); *C22C 38/26* (2013.01); *C22C 38/38* (2013.01); *C23C 2/02* (2013.01); *C23C 2/0224* (2022.08); *C23C 2/024* (2022.08); *C23C 2/28* (2013.01)

(58) Field of Classification Search
CPC ....................................................... C21D 9/46
See application file for complete search history.

(56) References Cited

U.S. PATENT DOCUMENTS

| | | | | |
|---|---|---|---|---|
| 2012/0012231 | A1* | 1/2012 | Murakami | ............... C21D 9/48 148/333 |
| 2014/0234660 | A1* | 8/2014 | Kawata | .................... C21D 9/46 148/504 |
| 2018/0044751 | A1 | 2/2018 | Takashima et al. | |
| 2019/0203315 | A1* | 7/2019 | Obata | .................... B32B 15/013 |

FOREIGN PATENT DOCUMENTS

| | | |
|---|---|---|
| CN | 1566389 A | 1/2005 |
| EP | 2039791 A1 | 3/2009 |
| EP | 2224029 A1 | 9/2010 |
| EP | 2415891 A1 | 2/2012 |
| EP | 3476963 A1 | 5/2019 |
| EP | 3584342 A1 | 12/2019 |
| JP | 2002059209 A | 2/2002 |
| JP | 2009214164 A | 9/2009 |
| JP | 2010209428 A | 9/2010 |
| JP | 2011111671 A | 6/2011 |
| JP | 2011179050 A | 9/2011 |
| JP | 2012001773 A | 1/2012 |

(Continued)

OTHER PUBLICATIONS

Chinese Office Action with Search Report for Chinese Application No. 201980076914.7, dated Jun. 6, 2022, 11 pages.
Korean Office Action for Korean Application No. 10-2021-7015491, dated Oct. 20, 2022 with Concise Statement of Relevance of Office Action, 6 pages.
International Search Report and Written Opinion for International Application No. PCT/JP2019/045019, dated Feb. 10, 2020, 6 pages.
Extended European Search Report for European Application No. 19 888 806.7, dated Nov. 19, 2021, 10 pages.

*Primary Examiner* — Keith D. Hendricks
*Assistant Examiner* — Joshua S Carpenter
(74) *Attorney, Agent, or Firm* — Buchanan Ingersoll & Rooney PC

(57) ABSTRACT

There is provided a high-strength steel sheet in which content amounts of a specific steel composition are limited and manufacturing conditions are optimized and that has a steel structure that contains ferrite and a harder phase and in which ferrite accounts for 30% to 70% in terms of area ratio, the harder phase contains bainitic ferrite, tempered martensite, martensite (including 0%), and retained austenite (including 0%), the maximum grain diameter of ferrite $d_{max}$ is 2.5 μm or less, and the area ratio of ferrite $A_F$ and the average grain diameter of ferrite $d_F$ satisfy $A_F$ [%]/$d_F$ [μm]≥15.

11 Claims, No Drawings

(56) References Cited

FOREIGN PATENT DOCUMENTS

| JP | 2015113475 A | 6/2015 | |
|---|---|---|---|
| JP | 2017039973 A | 2/2017 | |
| WO | 2016135793 A1 | 9/2016 | |
| WO | WO-2018043456 A1 * | 3/2018 | ........... B32B 15/013 |
| WO | 2018151023 A1 | 8/2018 | |

* cited by examiner

HIGH-STRENGTH STEEL SHEET AND METHOD FOR MANUFACTURING THE SAME

CROSS REFERENCE TO RELATED APPLICATIONS

This is the U.S. National Phase application of PCT/JP2019/045019, filed Nov. 18, 2019, which claims priority to Japanese Patent Application No. 2018-224170, filed Nov. 29, 2018, the disclosures of these applications being incorporated herein by reference in their entireties for all purposes.

FIELD OF THE INVENTION

The present invention relates to a high-strength steel sheet that is suitable for automotive structural members and the like and that has a tensile strength (TS) of 980 MPa or more and is excellent in ductility and stability of mechanical properties, and a method for manufacturing the same.

BACKGROUND OF THE INVENTION

These days, $CO_2$ emission control is tightened from an upsurge of environmental problems; in the automotive field, a weight reduction of an automotive body for the purpose of improvement in fuel efficiency is an issue. Thus, wall thickness reductions by using high-strength steel sheets for automotive parts are being advanced, and high-strength steel sheets with TS of 980 MPa or more are increasingly being used. It is desired that a high-strength steel sheet used for an automotive structural member or a reinforcing member manufactured by press forming possess both high strength and excellent ductility. Furthermore, as an issue when a high-strength steel sheet is used for a member, there is a considerable reduction in shape fixability at the time of press forming, which results from an increase in springback of the steel sheet due to the strength increase of the steel sheet. Hence, in the field of press technology, at the time of press forming, a procedure in which the amount of shape change after press forming die release is predicted in advance and the shape of the press forming die is designed with estimation of the amount of shape change is widely performed in order to ensure shape fixability. However, if the TS variation among steel sheets that are press materials is large, also the variation in springback is large and parts of the same shape are difficult to obtain even by performing press forming with the same press forming die, consequently small adjustments such as performing sheet metal working on the shapes one by one are indispensable after the press forming, and mass production efficiency is considerably reduced. Thus, it is required that the amount of TS variation be made as small as possible, that is, stability of mechanical properties be improved.

For example, Patent Literature 1 discloses a high-strength hot-dip galvanized steel sheet of 780 MPa or more having a steel composition containing, in mass %, C: 0.05 to 0.20%, Si: 0.01 to less than 0.6%, Mn: 1.6 to 3.5%, P: 0.05% or less, S: 0.01% or less, Al: 1.5% or less, N: 0.01% or less, and the balance including Fe and incidental impurities. The steel sheet has polygonal ferrite structure and a low temperature transformation-formed structure; the low temperature transformation-formed structure mentioned above contains at least bainite, and may further contain martensite. When a sheet plane 0.1 mm deep from a surface of the steel sheet is observed with a microscope in a total of 20 observation fields that are different positions in the sheet width direction and image analysis is performed on a 50 µm×50 µm region in each field of view, all the requirements of (a) to (d) below are satisfied.

(a) The maximum value of the area ratio of polygonal ferrite (Fmax)≤80%
(b) The minimum value of the area ratio of polygonal ferrite (Fmin)≥10%
(c) Fmax−Fmin≤40%
(d) The maximum value of the area ratio of martensite in the low temperature transformation-formed structure (Mmax)≤50%

Patent Literature 2 discloses a high-strength steel sheet that contains, in mass %, C: 0.07 to 0.25%, Si: 0.3 to 2.50%, Mn: 1.5 to 3.0%, Ti: 0.005 to 0.09%, B: 0.0001 to 0.01%, P: 0.001 to 0.03%, S: 0.0001 to 0.01%, Al: 2.5% or less, N: 0.0005 to 0.0100%, O: 0.0005 to 0.007%, and the balance including iron and incidental impurities and that has good ductility and good delayed fracture resistance properties and has a maximum tensile strength of 900 MPa or more. A microstructure of the steel sheet contains ferrite as a main component, and contains martensite having block sizes of 1 µm or less; the volume ratio of ferrite is 60% or more, and the C concentration in martensite is 0.3 to 0.9%; the yield ratio (YR) that is the ratio between the maximum tensile strength (TS) and the yield stress (YS) is 0.75 or less.

PATENT LITERATURE

Patent Literature 1: JP 2010-209428 A
Patent Literature 2: JP 2011-111671 A

SUMMARY OF THE INVENTION

However, in the technology disclosed in Patent Literature 1, the tensile strength (TS)×the total elongation (El) is 15150 MPa·% or less. Further, in Patent Literature 1 and Patent Literature 2, stability of mechanical properties is not considered.

Aspects of the present invention have been developed in view of such circumstances, and an object according to aspects of the present invention is to obtain a high-strength steel sheet that has a TS of 980 MPa or more and is excellent in ductility and stability of mechanical properties and provide a method for manufacturing the high-strength steel sheet.

In accordance with aspects of the present invention, "excellent in ductility" means that the value of TS×El is 17000 MPa·% or more. The stability of mechanical properties can be evaluated by using a coil and a cut sheet. In the case where it is possible to use a coil, TS in 10 or more positions 50 m or more away from each other in the rolling direction in the same coil are investigated. In the case where it is difficult to use a coil, TS in 10 or more different positions in the rolling direction and the width direction in a cut sheet are investigated. The difference between the maximum TS and the minimum TS among the investigated TS is taken as a TS variation, and the case where the TS variation (ΔTS=the maximum TS−the minimum TS) is less than 45 MPa is determined as excellent in stability of mechanical properties.

The present inventors conducted extensive studies in order to obtain a high-strength steel sheet that has a TS of 980 MPa or more and TS×El≥17000 MPa·% and is excellent in stability of mechanical properties with little TS variation and a method for manufacturing the same, and have found out the following.

It has been found that, when the steel structure contains ferrite and a harder phase, the ferrite accounts for 30% to 70% in terms of area ratio, the harder phase contains bainitic ferrite, tempered martensite, martensite, and retained austenite, the maximum grain diameter of ferrite $d_{max}$ is 2.5 µm or less, and the area ratio of ferrite $A_F$ and the average grain diameter of ferrite $d_F$ satisfy $A_F$ [%]/$d_F$ [µm]≥15, then a high-strength steel sheet that has a TS of 980 MPa or more and a value of TS×El of 17000 MPa·% or more and is also excellent in stability of mechanical properties is obtained.

Further, alloying elements were properly adjusted, rolling was performed while the maximum value of applied tension at the time of cold rolling was set to 98 MPa or more, heating was performed while, as an annealing temperature, the temperature was set to 720° C. to a $T_R$ temperature (° C.) (=944−203×[% C]$^{1/2}$+45×[% Si]−30×[% Mn]+150×[% Al]−20×[% Cu]+11×[% Cr]+400×[% Ti]), and heat retention was performed in this temperature range for 10 s or more. Next, cooling was performed up to room temperature at an average cooling rate of 10° C./s or more; it has been found that thereby it becomes possible to manufacture a high-strength steel sheet that has a TS of 980 MPa or more and a value of TS×El of 17000 MPa·% or more and is also excellent in stability of mechanical properties. Here, [% X] means mass % of composition element X of the steel sheet, and is set to 0 (zero) in the case of not containing composition element X.

Aspects of the present invention have been made on the basis of the findings mentioned above. That is, the primary features according to aspects of the present invention are as follows.

[1] A high-strength steel sheet including: a chemical composition containing, in mass %, C: 0.05% to 0.20%, Si: 0.30% to 2.50%, Mn: 1.50% to 3.40%, P: 0.001% to 0.100%, S: 0.0001% to 0.0200%, Al: 0.010% to 1.000%, N: 0.0005% to 0.0100%, Nb: 0.01% to 0.100%, and the balance including Fe and incidental impurities; and a steel structure that contains ferrite and a harder phase and in which the ferrite accounts for 30% to 70% in terms of area ratio, and the harder phase contains bainitic ferrite, tempered martensite, martensite (including 0%), and retained austenite (including 0%), in which a maximum grain diameter of ferrite $d_{max}$ is 2.5 µm or less, and an area ratio of ferrite $A_F$ and an average grain diameter of ferrite $d_F$ satisfy $A_F$ [%]/$d_F$ [µm]≥15.

[2] The high-strength steel sheet according to [1], further containing, in mass %, at least one or more elements selected from Ti: 0.100% or less, V: 0.100% or less, B: 0.0100% or less, Mo: 0.50% or less, Cr: 1.00% or less, Cu: 1.00% or less, Ni: 0.50% or less, As: 0.500% or less, Sb: 0.200% or less, Sn: 0.200% or less, Ta: 0.100% or less, Ca: 0.0200% or less, Mg: 0.0200% or less, Zn: 0.020% or less, Co: 0.020% or less, Zr: 0.020% or less, and REMs: 0.0200% or less.

[3] The high-strength steel sheet according to [1] or [2], having a zinc-based coating on a surface.

[4] The high-strength steel sheet according to [3], in which the zinc-based coating is a hot-dip galvanized coating or a galvannealed coating.

[5] A method for manufacturing a high-strength steel sheet, the method including: subjecting a steel slab having the chemical composition according to [1] or [2] to hot rolling, pickling, cold rolling with a maximum value of applied tension of 98 MPa or more, then heating at, as an annealing temperature, 720° C. to a $T_R$ temperature, heat retention in a temperature range of 720° C. to the $T_R$ temperature for 10 s or more, and subsequently cooling down to room temperature at an average cooling rate of 10° C./s or more.

In which $T_R$ temperature (° C.)=944−203×[% C]$^{1/2}$+45×[% Si]−30×[% Mn]+150×[% Al]−20×[% Cu]+11×[% Cr]+400×[% Ti]

Here, [% X] means mass % of composition element X of the steel sheet, and is set to 0 (zero) in the case of not containing composition element X.

[6] The method for manufacturing a high-strength steel sheet according to [5], in which galvanizing treatment is performed on a surface.

According to aspects of the present invention, a high-strength steel sheet that has a TS of 980 MPa or more and TS×El=17000 MPa·% or more and is also excellent in stability of mechanical properties with a TS variation (ΔTS: the maximum TS−the minimum TS) of less than 45 MPa can be obtained.

DETAILED DESCRIPTION OF EMBODIMENTS OF THE INVENTION

Hereinbelow, a high-strength steel sheet and a method for manufacturing the same according to aspects of the present invention are described in detail, separately for the chemical composition, the steel structure, and the manufacturing method.

First, appropriate ranges of the chemical composition and reasons for limiting these are described. In the following description, "%" indicating the content amount of a composition element of steel means "mass %" unless otherwise specified.

[C: 0.05% to 0.20%]

C is an element that raises the hardness of the harder phase and contributes to a strength increase of the steel sheet.

To obtain a TS of 980 MPa or more, it is necessary to incorporate at least C of 0.05% or more. On the other hand, if the content amount of C is more than 0.20%, the proportion between ferrite and the harder phase with respect to the change in annealing temperature sharply changes and TS varies, and therefore stability of mechanical properties is deteriorated. Hence, the content amount of C is set to 0.20% or less. Thus, the content amount of C is set to 0.05% to 0.20%, and preferably 0.07% to 0.15%.

[Si: 0.30% to 2.50%]

Si raises the hardness of ferrite, and reduces the hardness difference between ferrite and the harder phase. Thereby, the variation in TS when the proportion between ferrite and the harder phase is changed can be suppressed. To obtain the effect mentioned above, it is necessary to incorporate Si at 0.30% or more. On the other hand, if the content amount of Si is more than 2.50%, ferrite transformation is promoted during cooling in annealing. If ferrite transformation is promoted during cooling, the proportion between ferrite and the harder phase with respect to the change in cooling rate sharply changes and TS varies, and therefore stability of mechanical properties is deteriorated. Thus, in accordance with aspects of the present invention, the content amount of Si is set to 0.30% to 2.50%, and preferably 0.50% to 1.00%.

[Mn: 1.50% to 3.40%]

Mn is effective to ensure the strength of the steel sheet. Further, Mn improves quench hardenability, and therefore suppresses formation of pearlite or bainite in the cooling process in annealing and facilitates transformation from austenite to martensite. Here, if the content amount of Mn is less than 1.50%, bainite is formed in the cooling process in annealing, and ductility and stability of mechanical properties are deteriorated. On the other hand, if the content amount of Mn is more than 3.40%, ferrite transformation during cooling is suppressed and the area ratio of the harder phase after annealing is increased, and therefore stability of mechanical properties is deteriorated. Thus, the content amount of Mn is set to 1.50% to 3.40%, and preferably 1.70% to 3.20%.

[P: 0.001% to 0.100%]

P is an element that has an effect of solid solution strengthening and may be added in accordance with a desired strength. To obtain such an effect, the content amount of P needs to be set to 0.001% or more. On the other hand, if the content amount of P is more than 0.100%, P segregates at austenite grain boundaries and embrittles the grain boundaries, and therefore reduces ductility. Thus, the content amount of P is set to 0.001% to 0.100%, and preferably 0.005% to 0.050%.

[S: 0.0001% to 0.0200%]

S segregates at grain boundaries and embrittles the steel at the time of hot working, furthermore exists as sulfides in the steel sheet and reduces local deformability, and therefore reduces ductility. Hence, the content amount of S needs to be set to 0.0200% or less. There are no particular limitations on the lower limit of the content amount of S, but the amount of S is usually 0.0001% or more from restrictions in terms of production technology. Thus, the content amount of S is set to 0.0001% to 0.0200%.

[Al: 0.010% to 1.000%]

Al is an element that can suppress the formation of carbides in the cooling step in annealing and promote the formation of martensite, and is effective to ensure the strength of the steel sheet. To obtain such an effect, the content amount of Al needs to be set to 0.010% or more. On the other hand, if the content amount of Al is more than 1.000%, the amount of inclusions in the steel sheet is increased and local deformability is reduced, and ductility is reduced. Thus, the content amount of Al is set to 0.010% to 1.000%, and preferably 0.020% to 0.500%.

[N: 0.0005% to 0.0100%]

N binds to Al and forms AlN. Further, in the case where B is added, N forms BN. If the content amount of N is large, large amounts of coarse nitrides are formed and therefore local deformability is reduced, and ductility is reduced. Thus, in accordance with aspects of the present invention, the content amount of N is set to 0.0100% or less. On the other hand, the content amount of N needs to be set to 0.0005% or more from restrictions in terms of production technology. Thus, the content amount of N is set to 0.0005% to 0.0100%, preferably 0.0005% to 0.0070%, and more preferably 0.0005% to 0.0050%.

[Nb: 0.01% to 0.100%]

Nb is effective for stability of mechanical properties. Nb binds to C and forms NbC, thus suppresses recrystallization at the time of annealing and suppresses the coarsening of the grain diameter of ferrite after annealing, and raises the hardness of ferrite. Thereby, the change in TS when the proportion between ferrite and the harder phase is changed can be suppressed. To obtain the effect mentioned above, Nb is incorporated at 0.01% or more. On the other hand, if the content amount of Nb is more than 0.100%, ductility is reduced. Further, this is also a factor of cost increase. Thus, the content amount of Nb is set to 0.01% to 0.100%. Preferably 0.02% to 0.08%, and more preferably 0.03% to 0.06%.

The high-strength steel sheet according to aspects of the present invention further containing, in addition to the above-described chemical composition, in mass %, at least one element selected arbitrarily from Ti: 0.100% or less, V: 0.100% or less, B: 0.0100% or less, Mo: 0.50% or less, Cr: 1.00% or less, Cu: 1.00% or less, Ni: 0.50% or less, As: 0.500% or less, Sb: 0.200% or less, Sn: 0.200% or less, Ta: 0.100% or less, Ca: 0.0200% or less, Mg: 0.0200% or less, Zn: 0.020% or less, Co: 0.020% or less, Zr: 0.020% or less, and REMs (abbreviation for rare earth metals): 0.0200% or less. Note that the balance of chemical composition of the steel sheet is Fe and incidental impurities.

Ti and V form fine carbides, nitrides, or carbonitrides at the time of hot rolling or at the time of annealing, and thereby raise the strength of the steel sheet. If the content amounts of Ti and V are each more than 0.100%, large amounts of coarse carbides, nitrides, or carbonitrides are precipitated in ferrite, which is a base phase, or substructures of tempered martensite and martensite, or at prior austenite grain boundaries, and reduce local deformability and reduce ductility. Thus, in the case where Ti and V are added, each of the content amounts is set to 0.100% or less, preferably 0.001% to 0.100%, and more preferably 0.001% to 0.050%.

B is an element that can improve quench hardenability without lowering the martensitic start temperature; and can suppress the formation of pearlite or bainite in the cooling process in annealing, and facilitate transformation from austenite to martensite. If the content amount of B is more than 0.0100%, a crack occurs in the interior of the steel sheet during hot rolling, and therefore ductility is greatly reduced. Thus, in the case where B is added, each of the content amounts is set to 0.0100% or less, preferably 0.0001% to 0.0100%, more preferably 0.0001% to 0.0050%, and still more preferably 0.0001% to 0.0030%.

Mo is an element that can improve quench hardenability, and is an effective element to form tempered martensite and quenched martensite. Even if the content amount of Mo is more than 0.50%, further effects are difficult to obtain, furthermore an increase in the amount of inclusions or the like is caused and a defect or the like is caused to the surface or the interior, and ductility is greatly reduced. Thus, in the case where Mo is added, each of the content amounts is set to 0.50% or less, preferably 0.01% to 0.50%, more preferably 0.02% to 0.35%, and still more preferably 0.02% to 0.25%.

Cr and Cu not only play roles as solid solution strengthening elements, but also stabilize austenite in the cooling process in annealing (heating and cooling treatment on a cold rolled steel sheet), and facilitate the formation of tempered martensite and martensite. If the content amounts of Cr and Cu are each more than 1.00%, there is a concern that a crack of a surface layer will be brought about during hot rolling, furthermore an increase in the amount of inclusions or the like is caused and a defect or the like is caused to the surface or the interior, and ductility is greatly reduced. Thus, in the case where Cr and Cu are added, each of the content amounts is set to 1.00% or less. Preferably 0.01% to 1.00%, and more preferably 0.01% to 0.50%.

Ni contributes to a strength increase by solid solution strengthening and transformation toughening. If Ni is excessively added at more than 0.50%, there is a concern that a crack of a surface layer will be brought about during hot rolling, furthermore an increase in the amount of inclusions or the like is caused and a defect or the like is caused to the surface or the interior, and ductility is greatly reduced. Thus, in the case where Ni is added, each of the content amounts is set to 0.50% or less. Preferably 0.01% to 0.50%.

As is an effective element to improve corrosion resistance. If As is excessively added at more than 0.500%, red shortness is promoted, furthermore an increase in the amount of inclusions or the like is caused and a defect or the like is caused to the surface or the interior, and ductility is greatly reduced. Thus, in the case where As is added, each of the content amounts is set to 0.500% or less. Preferably 0.001% to 0.500%.

Sb and Sn are added in accordance with necessity from the viewpoint of suppressing the decarburization of a region extending approximately several tens of micrometers in the sheet thickness direction from the surface of the steel sheet, which occurs due to the nitriding or oxidation of the surface of the steel sheet. This is because suppressing such nitriding or oxidation prevents a decrease in the amount of martensite formed on the surface of the steel sheet and is effective to ensure the strength of the steel sheet. If either of these elements is excessively added at more than 0.200%, a reduction in ductility is brought about. Thus, in the case where Sb and Sn are added, each of the content amounts is set to 0.200% or less. Preferably 0.001% to 0.200%.

Ta, similarly to Ti and Nb, contributes to a strength increase by generating carbides or carbonitrides. In addition, Ta has the effect of being partially dissolved as solid solution in Nb carbides or Nb carbonitrides to form composite precipitates such as (Nb, Ta) (C,N), thus considerably suppressing the coarsening of precipitates, and stabilizing the contribution ratio to the improvement in strength of the steel sheet based on precipitation hardening. Hence, it is preferable that Ta be contained. Even if Ta is excessively added at more than 0.100%, the effect of stabilizing precipitates is saturated, furthermore an increase in the amount of inclusions or the like is caused and a defect or the like is caused to the surface or the interior, and ductility is greatly reduced. Thus, in the case where Ta is added, each of the content amounts is set to 0.100% or less. Preferably 0.001% to 0.100%.

Ca and Mg are elements used for deoxidation, and are also effective elements to spheroidize the shapes of sulfides to improve the bad influence of sulfides on ductility, particularly local ductility. If the content amount of at least one element of Ca and Mg is more than 0.0200%, an increase in the amount of inclusions or the like is caused and a defect or the like is caused to the surface or the interior, and ductility is greatly reduced. Thus, in the case where Ca and Mg are added, each of the content amounts is set to 0.0200% or less. Preferably 0.0001% to 0.0200%.

Each of Zn, Co, and Zr is an effective element to spheroidize the shapes of sulfides to improve the bad influence of sulfides on local ductility and stretch-flange formability. If the content amount of at least one element of Zn, Co, and Zr is more than 0.020%, an increase in the amount of inclusions or the like is caused and a defect or the like is caused to the surface or the interior, and ductility is greatly reduced. Thus, in the case where Zn, Co, and Zr are added, each of the content amounts is set to 0.020% or less. Preferably 0.001% to 0.020%.

REMs are effective elements to increase strength and improve corrosion resistance. If the content amount of REMs is more than 0.0200%, an increase in the amount of inclusions or the like is caused and a defect or the like is caused to the surface or the interior, and ductility is greatly reduced. Thus, in the case where REMs are added, each of the content amounts is set to 0.0200% or less. Preferably 0.0001% to 0.0200%.

The balance of compositions other than those described above is Fe and incidental impurities.

Next, the microstructure is described.

[Area Ratio of Ferrite: 30% to 70%]

In accordance with aspects of the present invention, this is a very important invention-constituting requirement. This is effective to improve ductility and ensure TS×El≥17000 MPa·% while ensuring a TS of 980 MPa or more. If the area ratio of ferrite is less than 30%, the area ratio of the harder phase is increased, and therefore ductility is reduced. On the other hand, if the area ratio of ferrite is more than 70%, tensile strength is reduced. Thus, the area ratio of ferrite is set to 30% to 70%, and preferably 40% to 60%.

The harder phase contains bainitic ferrite, tempered martensite, martensite, and retained austenite. It is preferable that the total area ratio of bainitic ferrite and tempered martensite be 30 to 70%, the area ratio of martensite be 5% or less, and the area ratio of retained austenite be 5% or less. The area ratio of each of martensite and retained austenite may be 0%.

[Maximum Grain Diameter of Ferrite $d_{max}$ being 2.5 μm or Less]

In accordance with aspects of the present invention, this is a very important invention-constituting requirement. The reduction in the grain diameter of ferrite raises the hardness of ferrite. Thereby, the change in TS when the proportion between ferrite and the harder phase is changed can be suppressed, and stability of mechanical properties is improved. On the other hand, if the maximum grain diameter of ferrite $d_{max}$ is more than 2.5 μm, the hardness of ferrite is reduced, the change in TS when the proportion between ferrite and the harder phase is changed is increased, and stability of mechanical properties is deteriorated. Thus, the maximum grain diameter of ferrite $d_{max}$ is set to 2.5 μm or less.

[The Area Ratio of Ferrite $A_F$ and the Average Grain Diameter of Ferrite $d_F$ Satisfying the Inequality of $A_F$ [%]/$d_F$[μm]≥15]

In accordance with aspects of the present invention, this is a very important invention-constituting requirement. The area ratio of ferrite $A_F$ and the average grain diameter of ferrite $d_F$ are important parameters to ensure a desired tensile strength. The inequality mentioned above decides on the maximum value of the average grain diameter of ferrite $d_F$ with respect to the area ratio of ferrite. In the case where the inequality mentioned above is satisfied, the reduction in tensile strength due to an increase in the area ratio of ferrite can be suppressed by the effect of a reduction in the crystal grain diameter of ferrite. Thus, the change in TS when the proportion between ferrite and the harder phase is changed can be suppressed, and stability of mechanical properties is improved.

Next, a manufacturing method is described.

A high-strength steel sheet according to aspects of the present invention is manufactured by subjecting a steel slab having the prescribed chemical composition described above to hot rolling, pickling, cold rolling with a maximum value of applied tension of 98 MPa or more, then heating to, as an annealing temperature, 720° C. to the $T_R$ temperature, heat retention in this temperature range for 10 s or more, and next cooling down to room temperature at an average cooling rate of 10° C./s or more.

Each step will now be described in detail.

In accordance with aspects of the present invention, the method for smelting a steel material (slab) is not particularly limited, and any known smelting method such as a converter or an electric furnace is fitting. The casting method is not particularly limited either, but a continuous casting method is suitable. The steel material (slab) is preferably manufactured by a continuous casting method in order to prevent macro-segregation, but may also be manufactured by an ingot making method, a thin slab casting method, or the like.

Hot rolling is performed on the steel material (slab) obtained in the above manner. For hot rolling conditions, it is preferable that the heating temperature be 1100 to 1300° C., a finish rolling delivery temperature be 800 to 950° C., and the coiling temperature be 750° C. or less.

After a steel slab is manufactured, a conventional method in which cooling is once performed up to room temperature and then heating is performed again may be employed; in addition, also an energy saving process can be employed without problems, such as direct sending rolling or direct rolling in which, without performing cooling down to room temperature, a warm piece is introduced as it is into a heating furnace or is subjected to rolling immediately after subjected to slight heat retention. The slab is fashioned into a sheet bar by rough rolling under common conditions; in the case where the heating temperature is set to a low level, it is preferable to, before finish rolling, heat the sheet bar by using a bar heater or the like, from the viewpoint of preventing trouble at the time of hot rolling. When hot rolling the slab, the slab may be hot rolled after reheated in a heating furnace, or the slab may be subjected to hot rolling after heated for a short time in a heating furnace of 1250° C. or more for the purpose of temperature compensation. The hot rolling method is not particularly limited, and may be rolling based on rough rolling and finish rolling, or rolling of only finish rolling in which rough rolling is omitted. It is also possible to perform finish rolling in which, at the time of hot rolling, rough rolled sheets are joined together and are continuously rolled, finish rolling in which a rough rolled sheet is once coiled and is then rolled, or finish rolling in which lubrication rolling is performed as part or the whole of the finish rolling in order to reduce the rolling load at the time of hot rolling. Performing lubrication rolling is effective also from the viewpoints of the equalization of the shape of the steel sheet and the equalization of material quality. The coefficient of friction at the time of lubrication rolling is preferably set in the range of 0.10 to 0.25.

Pickling is performed on the hot rolled steel sheet thus manufactured. Pickling can remove oxides of the surface of the steel sheet, and is therefore important to ensure good phosphatability and plating quality in the high-strength steel sheet of the end product. Pickling may be performed once, or may be performed multiple times separately.

When performing cold rolling on the hot rolled, subsequently pickling-treated sheet obtained in the above manner, the hot rolled, subsequently pickling-treated sheet may be subjected to cold rolling as it is, or may be subjected to cold rolling after subjected to heat treatment.

[Maximum Value of Applied Tension at the Time of Cold Rolling being 98 MPa or More]

In accordance with aspects of the present invention, this is a very important invention-constituting requirement. Here, the applied tension refers to tension per unit cross-sectional area applied in the rolling direction at the time of rolling. If the maximum value of applied tension at the time of cold rolling is less than 98 MPa, it is difficult to ensure an amount of strain necessary to bring out the effect of crystal grain refinement by recovery and recrystallization, and the grain diameter of ferrite after annealing treatment is coarsened. Hence, the variation in tensile strength is increased, and stability of mechanical properties is deteriorated. Thus, the maximum value of applied tension in cold rolling is set to 98 MPa or more. On the other hand, if the maximum value of applied tension is too large, a cost increase is caused; thus, the maximum value of applied tension is preferably 392 MPa or less. More preferably, 98 MPa to 294 MPa.

[Annealing Temperature in the Annealing Step: 720° C. to the $T_R$ Temperature]

In accordance with aspects of the present invention, this is a very important invention-constituting requirement. If the annealing temperature in the annealing step is less than 720° C., a fraction of austenite cannot be ensured during annealing, and in the end a desired area ratio of the harder phase is not ensured. Hence, it is difficult to ensure strength and ensure balance between good strength and ductility. On the other hand, if the annealing temperature in the annealing step is more than the $T_R$ temperature mentioned below, the annealing is annealing in a temperature range of an austenite single-phase. Hence, ferrite is not formed in the cooling step, and in the end ferrite at a desired area ratio is not obtained and ductility is reduced. Thus, the annealing temperature in the annealing step is set to 720° C. to the $T_R$ temperature, and preferably 750° C. to the $T_R$ temperature.

The $T_R$ temperature can be calculated by $T_R$ temperature (° C.)=$944-203\times[\% C]^{1/2}+45\times[\% Si]-30\times[\% Mn]+150\times[\% Al]-20\times[\% Cu]+11\times[\% Cr]+400\times[\% Ti]$ Here, [% X] means mass % of composition element X of the steel sheet, and is set to 0 (zero) in the case of not containing composition element X.

[Heat Retention Time in the Annealing Step: 10 s or More]

If the heat retention time in the annealing step is less than 10 s, a fraction of austenite cannot be ensured during annealing, and in the end there is more than a desired area ratio of ferrite. Hence, it is difficult to ensure strength and ensure balance between good strength and ductility. The upper limit of the heat retention time in the annealing step is not particularly limited, but is preferably 600 s or less from the viewpoint of productivity. Thus, the heat retention time at the annealing temperature is set to 10 s or more, preferably 30 s or more, and more preferably 30 s to 600 s.

[Cooling Down to Room Temperature at an Average Cooling Rate of 10° C./s or More]

If the average cooling rate is less than 10° C./s, the coarsening of ferrite and the formation of pearlite occur during cooling. Hence, in the end it is difficult to ensure strength and ensure balance between good strength and ductility. The upper limit of the average cooling rate is not particularly limited, but it is up to 120° C./s that are industrially feasible. Thus, the average cooling rate down to room temperature is set to 10° C./s or more, preferably 10° C./s to 120° C./s, and more preferably 15° C./s to 100° C./s.

Cooling after holding does not need to be particularly prescribed, and cooling may be performed to a desired temperature by an arbitrary method. The desired temperature mentioned above is desirably approximately room temperature.

Temper rolling may be performed on the high-strength steel sheet mentioned above. If the temper rolling reduction ratio is more than 1.5%, ductility is reduced; thus, the temper rolling reduction ratio is preferably set to 1.5% or less. The lower limit of the temper rolling reduction ratio is not particularly limited, but is preferably 0.1% or more to obtain a shape correction effect.

[Method for Manufacturing a Plated Steel Sheet]

A method for manufacturing a plated steel sheet according to aspects of the present invention (a high-strength steel sheet having a coating on a surface) is a method of performing plating on a high-strength steel sheet. The plating treatment is hot-dip galvanizing treatment of forming a zinc-based coating or a treatment of performing hot-dip galvanizing treatment and then performing alloying of the coating, i.e. galvannealing. Further, annealing and galvanizing may be continuously performed on one line. In addition, a plating layer (a coating) may be formed by electroplating such as Zn—Ni alloy-coated electrolytic plating, or hot-dip zinc-aluminum-magnesium alloy plating may be performed.

When performing hot-dip galvanizing treatment, a high-strength steel sheet is dipped in a galvanizing bath of 440° C. to 500° C. to perform hot-dip galvanizing treatment, and then the amount of plating attached is adjusted by gas wiping or the like. The hot-dip galvanizing preferably uses a galvanizing bath in which an amount of Al is 0.10 mass % to 0.23 mass %. When performing alloying treatment of zinc plating, after hot-dip galvanizing, alloying treatment of the zinc plating is performed in the temperature range of 470° C. to 600° C. If alloying treatment is performed at a temperature more than 600° C., there is a case where untransformed austenite is transformed to pearlite and TS is reduced. Thus, when performing alloying treatment of zinc plating, it is preferable to perform alloying treatment in the temperature range of 470° C. to 600° C., and it is more preferable to perform alloying treatment in the temperature range of 470° C. to 560° C. Further, electro-galvanizing treatment may be performed. The amount of plating attached is preferably 20 to 80 g/m² per one surface (both-surface plating); for a galvannealed steel sheet (GA), it is preferable to perform the alloying treatment mentioned below and thereby set the Fe concentration in the plating layer to 7 to 15 mass %.

Although a description has been given with priority given to the case of galvanizing, the kind of plating metal of Zn plating, Al plating, or the like is not particularly limited.

Other conditions for the manufacturing method are not particularly limited; however, from the viewpoint of productivity, the series of treatments such as annealing, hot-dip galvanizing, and alloying treatment of galvanizing mentioned above are preferably performed on a CGL (Continuous Galvanizing Line), which is a hot-dip galvanizing line. After hot-dip galvanizing, wiping may be performed in order to adjust the amount of mass per unit area of plating. Conditions for plating, etc. other than the conditions mentioned above may be based on a conventional method of hot-dip galvanizing.

The rolling reduction ratio of skin pass rolling after plating treatment is preferably in the range of 0.1% to 2.0%. If the rolling reduction ratio is less than 0.1%, the effect is small, and furthermore the control is difficult. If the rolling reduction ratio is more than 2.0%, ductility is reduced; thus, the rolling reduction ratio is preferably set to 2.0% or less. Temper rolling may be performed online, or may be performed offline. Further, temper rolling of a target rolling reduction ratio may be performed at a time, or may be performed several times separately.

EXAMPLES

A steel having any of the chemical compositions shown in Table 1 and containing Fe and incidental impurities as the balance was smelted with a converter, and was fashioned into a slab by a continuous casting method. The obtained slab was subjected to hot rolling at a heating temperature of 1200° C., a finish rolling delivery temperature of 900° C., and a coiling temperature of 500° C., was pickled after the hot rolling, was subsequently subjected to cold rolling under the corresponding condition shown in Table 2 into a cold rolled material with a sheet thickness of 1.0 to 1.8 mm, and was subsequently subjected to annealing treatment; thus, a high-strength cold rolled steel sheet (CR) was obtained. Some high-strength cold rolled steel sheets were subjected to galvanizing treatment, and hot-dip galvanized steel sheets (GI), galvannealed steel sheets (GA), and an electro-galvanized steel sheet (EG) were obtained. For the hot-dip galvanizing bath, a galvanizing bath containing Al: 0.14 mass % or 0.19 mass % was used for GI, and a galvanizing bath containing Al: 0.14 mass % was used for GA; the bath temperature was set to 470° C. The amount of plating attached was set to 72 g/m² or 45 g/m² per one surface (both-surface plating) in GI, and to 45 g/m² per one surface (both-surface plating) in GA. For GA, the Fe concentration in the plating layer was set to 9 mass % to 12 mass %.

The $T_R$ temperature (° C.) was found by using the following formula.

$$T_R \text{ temperature}(° C.) = 944 - 203 \times [\% C]^{1/2} + 45 \times [\% Si] - 30 \times [\% Mn] + 150 \times [\% Al] - 20 \times [\% Cu] + 11 \times [\% Cr] + 400 \times [\% Ti]$$

Here, [% X] means mass % of composition element X of the steel sheet, and is set to 0 (zero) in the case of not containing composition element X.

The high-strength cold rolled steel sheets (CR), the hot-dip galvanized steel sheets (GI), the galvannealed steel sheets (GA), and the electro-galvanized steel sheet (EG) obtained in the above manner were taken as test samples of steel, and mechanical properties were evaluated.

The structures and the mechanical properties are shown in Table 3.

The area ratio of ferrite $A_F$ and the area ratio of the harder phase were measured by a method in which a flat surface of a sheet-thickness cross section parallel to the rolling direction of the steel sheet was smoothed by polishing and was then corroded with a 3-volume % nital solution, and a SEM photograph of a position of ¼ of the sheet thickness was taken at an appropriate magnification between 1000 to 3000 times. For the prescription of structure, ferrite and the harder phase were identified by visual observation, and the structure proportion was found by image analysis and the resulting value was taken as the area ratio of the corresponding phase.

The average grain diameter of ferrite $d_F$ and the maximum grain diameter of ferrite $d_{max}$ were measured by a method in which a SEM photograph of a position of ¼ of the sheet thickness was taken at an appropriate magnification between 1000 to 3000 times of a cross section parallel to the rolling direction of the steel sheet. The grain diameter of ferrite was measured by a method in which a region surrounded by a grain boundary was regarded as one grain, the area of the grain was measured, and then the resulting value was converted into a diameter equivalent to a circle of the area. Using grain diameters of ferrite measured by the method mentioned above, the average of the grain diameters of ferrite in a region of 50 μm×50 μm as the actual length was taken as the average grain diameter of ferrite $d_F$, and the maximum value of the grain diameters of ferrite was taken as the maximum grain diameter of ferrite $d_{max}$.

The area ratio of bainitic ferrite and tempered martensite can be found by subtracting the area ratio of martensite and retained austenite from the area ratio of the harder phase. The distinction between bainitic ferrite and tempered martensite by visual observation is difficult in the present manufacturing method; thus, the total area ratio of these is used.

The area ratio of martensite can be found by the following method. An L-cross section of the steel sheet is polished and is then corroded with a 3-vol. % nital solution, and 10 observation fields in positions of ¼ of the sheet thickness (positions corresponding to ¼ of the sheet thickness in the depth direction from a surface of the steel sheet) are observed at a magnification of 2000 times by using a SEM. In the structure image mentioned above, martensite is a structure that is a protuberance in the harder phase, has fine unevenness in the interior, and does not have carbides in the interior. The area ratio of martensite can be found from the average value of the values of the 10 observation fields.

The value of the volume ratio of retained austenite is used as the area ratio of retained austenite. The volume ratio of retained austenite was found by a method in which the steel sheet was polished from a position of ¼ of the sheet thickness to a plane of 0.1 mm and was then further polished 0.1 mm by chemical polishing, the polished surface was investigated by using the CoKα line with an X-ray diffractometer to measure the integrated intensity ratios between the diffraction peaks of the {200}, plane, the {220}, plane, and the {311}, plane of fcc iron and the {200}, plane, the {211}, plane, and the {220}, plane of bcc iron, and the obtained nine integrated intensity ratios were averaged.

For the mechanical properties, TS and El were measured by a tensile test in conformity with JIS Z 2241: 2011 by using a JIS No. 5 test piece that was extracted such that the longitudinal direction of the test piece was a direction (the C-direction) at a right angle to the rolling direction of the steel sheet. In accordance with aspects of the present invention, "excellent in ductility" means that the value of TS×El is 17000 MPa·% or more.

The stability of mechanical properties was evaluated by using a coil and a cut sheet. In the case of a coil, TS in 10 or more positions 50 m or more away from each other in the rolling direction in the same coil were investigated. In the case of a cut sheet, TS in 10 or more different positions in the rolling direction and the width direction were investigated. The difference between the maximum TS and the minimum TS among the investigated TS was taken as a TS variation, and the case where the TS variation (ΔTS=the maximum TS−the minimum TS) was less than 45 MPa was determined as excellent in stability of mechanical properties.

In Present Invention Examples, TS is 980 MPa or more, and ductility and stability of mechanical properties are excellent. On the other hand, in Comparative Examples, one or more of ductility and stability of mechanical properties are poor.

Hereinabove, embodiments of the present invention are described; however, the present invention is not limited by a description that is part of the disclosure of the present invention according to the present embodiments. That is, all other embodiments, practical examples, application technologies, and the like made by those skilled in the art or the like on the basis of the present embodiments are included in the scope according to aspects of the present invention. For example, in the series of heat treatments in the manufacturing method mentioned above, the equipment, etc. that perform heat treatment on the steel sheet are not particularly limited, as long as the heat history conditions are satisfied.

TABLE 1

| Steel type | Component composition (mass %) | | | | | | | | | | | | | |
|---|---|---|---|---|---|---|---|---|---|---|---|---|---|---|
| | C | Si | Mn | P | S | Al | N | Nb | Ti | V | B | Mo | Cr | Cu |
| A | 0.145 | 0.67 | 2.57 | 0.024 | 0.0041 | 0.047 | 0.0042 | 0.058 | — | — | — | — | — | — |
| B | 0.122 | 0.52 | 2.66 | 0.030 | 0.0014 | 0.042 | 0.0032 | 0.049 | — | — | — | — | — | — |
| C | 0.097 | 0.71 | 2.60 | 0.028 | 0.0047 | 0.952 | 0.0017 | 0.052 | — | — | — | — | — | — |
| D | 0.128 | 0.61 | 2.63 | 0.030 | 0.0014 | 0.046 | 0.0029 | 0.095 | — | — | — | — | — | — |
| E | 0.121 | 2.10 | 2.69 | 0.010 | 0.0028 | 0.024 | 0.0015 | 0.049 | — | — | — | — | — | — |
| F | 0.126 | 0.53 | 3.03 | 0.042 | 0.0039 | 0.043 | 0.0039 | 0.056 | — | — | — | — | — | — |
| G | 0.053 | 0.58 | 3.02 | 0.018 | 0.0020 | 0.030 | 0.0029 | 0.050 | — | — | — | — | — | — |
| H | 0.054 | 0.67 | 3.37 | 0.011 | 0.0030 | 0.036 | 0.0029 | 0.045 | — | — | — | — | — | — |
| I | 0.041 | 0.84 | 2.43 | 0.049 | 0.0009 | 0.031 | 0.0040 | 0.049 | — | — | — | — | — | — |
| J | 0.126 | 0.20 | 3.00 | 0.027 | 0.0050 | 0.044 | 0.0032 | 0.047 | — | — | — | — | — | — |
| K | 0.119 | 0.31 | 1.39 | 0.014 | 0.0049 | 0.043 | 0.0016 | 0.043 | — | — | — | — | — | — |
| L | 0.123 | 0.33 | 3.65 | 0.034 | 0.0014 | 0.033 | 0.0024 | 0.057 | — | — | — | — | — | — |
| M | 0.117 | 0.74 | 1.90 | 0.037 | 0.0006 | 0.027 | 0.0014 | 0.004 | — | — | — | — | — | — |
| N | 0.124 | 1.95 | 2.690 | 0.019 | 0.0009 | 0.044 | 0.0035 | 0.126 | — | — | — | — | — | — |
| O | 0.134 | 0.97 | 1.860 | 0.011 | 0.0158 | 1.250 | 0.0086 | 0.085 | — | — | — | — | — | — |
| P | 0.106 | 0.55 | 2.51 | 0.043 | 0.0030 | 0.058 | 0.0026 | 0.046 | 0.015 | — | — | — | — | — |
| Q | 0.099 | 0.57 | 2.65 | 0.044 | 0.0043 | 0.037 | 0.0042 | 0.053 | — | — | 0.0006 | — | — | — |
| R | 0.128 | 0.61 | 2.28 | 0.012 | 0.0005 | 0.021 | 0.0043 | 0.057 | — | 0.029 | — | — | 0.34 | — |
| S | 0.101 | 0.63 | 2.57 | 0.032 | 0.0042 | 0.040 | 0.0024 | 0.048 | — | — | — | 0.05 | — | 0.20 |
| T | 0.126 | 0.56 | 2.47 | 0.007 | 0.0042 | 0.034 | 0.0049 | 0.045 | — | — | — | — | — | — |
| U | 0.124 | 0.71 | 2.30 | 0.048 | 0.0019 | 0.050 | 0.0023 | 0.053 | — | — | — | — | — | — |
| V | 0.125 | 0.63 | 2.32 | 0.018 | 0.0040 | 0.038 | 0.0015 | 0.058 | — | — | — | — | — | — |
| W | 0.120 | 0.75 | 3.17 | 0.042 | 0.0035 | 0.050 | 0.0013 | 0.058 | 0.024 | — | — | — | — | — |
| X | 0.117 | 0.50 | 1.99 | 0.033 | 0.0045 | 0.032 | 0.0028 | 0.042 | 0.042 | — | — | — | — | — |
| Y | 0.100 | 0.80 | 2.30 | 0.047 | 0.0040 | 0.046 | 0.0037 | 0.049 | 0.013 | — | — | — | — | — |
| Z | 0.103 | 0.31 | 2.69 | 0.023 | 0.0044 | 0.039 | 0.0024 | 0.057 | — | — | — | — | — | — |
| AA | 0.162 | 0.73 | 2.41 | 0.011 | 0.0048 | 0.043 | 0.0038 | 0.049 | — | — | — | — | — | — |
| AB | 0.064 | 0.70 | 2.56 | 0.010 | 0.0006 | 0.036 | 0.0039 | 0.045 | — | — | — | — | — | — |

| Steel type | Component composition (mass %) | | | | | | | | | | $T_R$ Temperature (° C.) | Remarks |
|---|---|---|---|---|---|---|---|---|---|---|---|---|
| | Ni | As | Sb | Sn | Ta | Ca | Mg | Zn | Co | Zr | REMs | | |
| A | — | — | — | — | — | — | — | — | — | — | — | 827 | Invented steel |
| B | — | — | — | — | — | — | — | — | — | — | — | 823 | Invented steel |
| C | — | — | — | — | — | — | — | — | — | — | — | 978 | Invented steel |
| D | — | — | — | — | — | — | — | — | — | — | — | 827 | Invented steel |
| E | — | — | — | — | — | — | — | — | — | — | — | 891 | Invented steel |
| F | — | — | — | — | — | — | — | — | — | — | — | 811 | Invented steel |

TABLE 1-continued

| | | | | | | | | | | | | | | |
|---|---|---|---|---|---|---|---|---|---|---|---|---|---|---|
| G | — | — | — | — | — | — | — | — | — | — | — | 837 | Invented steel |
| H | — | — | — | — | — | — | — | — | — | — | — | 831 | Invented steel |
| I | — | — | — | — | — | — | — | — | — | — | — | 872 | Comparative steel |
| J | — | — | — | — | — | — | — | — | — | — | — | 798 | Comparative steel |
| K | — | — | — | — | — | — | — | — | — | — | — | 853 | Comparative steel |
| L | — | — | — | — | — | — | — | — | — | — | — | 783 | Comparative steel |
| M | — | — | — | — | — | — | — | — | — | — | — | 855 | Comparative steel |
| N | — | — | — | — | — | — | — | — | — | — | — | 886 | Comparative steel |
| O | — | — | — | — | — | — | — | — | — | — | — | 1045 | Comparative steel |
| P | — | — | — | — | — | — | — | — | — | — | — | 842 | Invented steel |
| Q | — | — | — | — | — | — | — | — | — | — | — | 832 | Invented steel |
| R | — | — | — | — | — | — | — | — | — | — | — | 837 | Invented steel |
| S | — | — | — | — | — | — | — | — | — | — | — | 833 | Invented steel |
| T | 0.40 | — | 0.007 | — | — | — | — | — | — | — | — | 828 | Invented steel |
| U | — | 0.007 | — | 0.007 | — | — | — | — | — | — | — | 843 | Invented steel |
| V | — | — | — | — | 0.012 | — | — | — | — | — | — | 837 | Invented steel |
| W | — | — | 0.010 | — | — | — | — | — | — | — | — | 830 | Invented steel |
| X | — | — | — | 0.009 | — | — | — | — | — | — | — | 859 | Invented steel |
| Y | — | — | — | — | 0.005 | — | — | — | — | — | — | 859 | Invented steel |
| Z | — | — | — | — | — | 0.0026 | — | — | — | — | — | 818 | Invented steel |
| AA | — | — | — | — | — | — | 0.0022 | 0.011 | 0.015 | 0.012 | — | 829 | Invented steel |
| AB | — | — | — | — | — | — | — | — | — | — | 0.0031 | 853 | Invented steel |

Underlined: indicates outside of the scope of invention.

TABLE 2

| | | | Annealing treatment | | | | | |
|---|---|---|---|---|---|---|---|---|
| No. | Steel type | Maximum value of applied tension at the time of cold rolling (MPa) | Annealing temperature (° C.) | Heat retention time in the annealing step (s) | Average cooling rate from annealing temperature to room temperature (° C./s) | Alloying temperature (° C.) | Kind* | Remarks |
| 1 | A | 138 | 783 | 227 | 23 | — | CR | Invention example |
| 2 | B | 217 | 760 | 252 | 23 | — | CR | Invention example |
| 3 | B | 238 | 765 | 299 | 19 | 548 | GA | Invention example |
| 4 | B | 49 | 805 | 210 | 24 | — | CR | Comparative example |
| 5 | B | 196 | 865 | 69 | 39 | — | CR | Comparative example |
| 6 | B | 153 | 805 | 7 | 28 | — | CR | Comparative example |
| 7 | B | 236 | 755 | 77 | 5 | — | CR | Comparative example |
| 8 | C | 186 | 809 | 123 | 34 | — | CR | Invention example |
| 9 | D | 234 | 787 | 178 | 31 | — | CR | Invention example |
| 10 | E | 111 | 771 | 112 | 19 | — | CR | Invention example |
| 11 | F | 136 | 807 | 224 | 19 | — | CR | Invention example |
| 12 | G | 133 | 768 | 242 | 37 | — | CR | Invention example |
| 13 | H | 139 | 805 | 292 | 25 | — | CR | Invention example |
| 14 | I | 204 | 803 | 165 | 40 | — | CR | Comparative example |
| 15 | J | 146 | 772 | 71 | 30 | — | CR | Comparative example |
| 16 | K | 290 | 777 | 105 | 21 | — | CR | Comparative example |
| 17 | L | 126 | 781 | 184 | 38 | — | CR | Comparative example |
| 18 | M | 203 | 808 | 208 | 27 | — | CR | Comparative example |
| 19 | N | 147 | 762 | 103 | 20 | — | CR | Comparative example |
| 20 | O | 196 | 762 | 55 | 40 | — | CR | Comparative example |
| 21 | P | 236 | 772 | 296 | 30 | — | GI | Invention example |
| 22 | Q | 268 | 809 | 232 | 31 | — | GI | Invention example |
| 23 | R | 267 | 758 | 284 | 29 | 558 | GA | Invention example |
| 24 | S | 113 | 766 | 138 | 24 | — | CR | Invention example |
| 25 | T | 188 | 802 | 248 | 25 | — | CR | Invention example |
| 26 | U | 110 | 807 | 116 | 33 | — | CR | Invention example |
| 27 | V | 270 | 789 | 181 | 36 | 557 | GA | Invention example |
| 28 | W | 286 | 803 | 149 | 39 | — | GI | Invention example |
| 29 | X | 261 | 761 | 197 | 36 | — | EG | Invention example |
| 30 | Y | 194 | 786 | 168 | 37 | — | CR | Invention example |

TABLE 2-continued

| | | | Annealing treatment | | | | | |
|---|---|---|---|---|---|---|---|---|
| No. | Steel type | Maximum value of applied tension at the time of cold rolling (MPa) | Annealing temperature (° C.) | Heat retention time in the annealing step (s) | Average cooling rate from annealing temperature to room temperature (° C./s) | Alloying temperature (° C.) | Kind* | Remarks |
| 31 | Z | 255 | 799 | 70 | 27 | — | CR | Invention example |
| 32 | AA | 264 | 765 | 197 | 39 | — | CR | Invention example |
| 33 | AB | 181 | 795 | 65 | 20 | — | CR | Invention example |

Underlined: indicates outside of the scope of invention.
(*)CR: cold rolled steel sheet (without plating),
GI: hot-dip galvanized steel sheet (without alloying treatment of galvanizing),
GA: galvannealed steel sheet,
EG: electro-galvanized steel sheet

TABLE 3

| No. | Steel type | Area ratio of ferrite ($A_F$) (%) | Area ratio of harder phase* (%) | Area ratio of bainitic ferrite + tempered martensite (%) | Area ratio of martensite (%) | Area ratio of retained austenite (%) | Area ratio of pearlite (%) | Average grain diameter of ferrite ($d_F$) (μm) |
|---|---|---|---|---|---|---|---|---|
| 1 | A | 55 | 45 | 44 | 1 | 0 | 0 | 0.9 |
| 2 | B | 69 | 31 | 30 | 0 | 1 | 0 | 1.5 |
| 3 | B | 62 | 38 | 36 | 2 | 0 | 0 | 1.8 |
| 4 | B | 36 | 64 | 61 | 3 | 0 | 0 | 4.2 |
| 5 | B | 1 | 99 | 98 | 0 | 1 | 0 | 2.4 |
| 6 | B | 82 | 18 | 17 | 1 | 0 | 0 | 1.8 |
| 7 | B | 78 | 15 | 13 | 0 | 2 | 7 | 3.2 |
| 8 | C | 66 | 34 | 32 | 0 | 2 | 0 | 2.3 |
| 9 | D | 31 | 69 | 67 | 2 | 0 | 0 | 1.5 |
| 10 | F | 68 | 32 | 28 | 0 | 4 | 0 | 1.7 |
| 11 | F | 34 | 66 | 65 | 1 | 0 | 0 | 0.9 |
| 12 | G | 68 | 32 | 30 | 2 | 0 | 0 | 2.0 |
| 13 | H | 35 | 65 | 63 | 0 | 2 | 0 | 1.6 |
| 14 | I | 48 | 52 | 50 | 0 | 2 | 0 | 2.1 |
| 15 | J | 41 | 59 | 57 | 1 | 1 | 0 | 0.8 |
| 16 | K | 56 | 34 | 34 | 0 | 0 | 10 | 2.2 |
| 17 | L | 22 | 78 | 75 | 2 | 1 | 0 | 0.8 |
| 18 | M | 36 | 64 | 62 | 0 | 2 | 0 | 3.0 |
| 19 | N | 66 | 34 | 32 | 0 | 2 | 0 | 1.1 |
| 20 | O | 68 | 32 | 32 | 0 | 0 | 0 | 1.6 |
| 21 | P | 66 | 34 | 29 | 4 | 1 | 0 | 1.7 |
| 22 | Q | 35 | 65 | 65 | 0 | 0 | 0 | 1.7 |
| 23 | R | 68 | 32 | 30 | 1 | 1 | 0 | 1.9 |
| 24 | S | 56 | 44 | 42 | 2 | 0 | 0 | 1.6 |
| 25 | T | 33 | 67 | 66 | 0 | 1 | 0 | 1.9 |
| 26 | U | 35 | 65 | 65 | 0 | 0 | 0 | 1.8 |
| 27 | V | 45 | 55 | 51 | 3 | 1 | 0 | 1.9 |
| 28 | W | 31 | 69 | 68 | 0 | 1 | 0 | 0.7 |
| 29 | X | 65 | 35 | 33 | 0 | 2 | 0 | 1.9 |
| 30 | Y | 53 | 47 | 46 | 1 | 0 | 0 | 1.7 |
| 31 | Z | 33 | 67 | 66 | 1 | 0 | 0 | 1.6 |
| 32 | AA | 61 | 39 | 36 | 3 | 0 | 0 | 1.3 |
| 33 | AB | 47 | 53 | 50 | 1 | 2 | 0 | 2.0 |

| No. | Maximum grain diameter of ferrite ($d_{max}$) (μm) | $A_F/d_F$ | Sheet thickness (mm) | TS (MPa) | El (%) | TS × El (MPa · %) | Δ TS (MPa) | Remarks |
|---|---|---|---|---|---|---|---|---|
| 1 | 1.0 | 61 | 1.2 | 1016 | 19 | 19304 | 23 | Invention example |
| 2 | 1.8 | 46 | 1.2 | 1001 | 19 | 19019 | 41 | Invention example |
| 3 | 2.0 | 34 | 1.2 | 1031 | 18 | 18558 | 35 | Invention example |
| 4 | 5.5 | 9 | 1.2 | 1134 | 16 | 18144 | 49 | Comparative example |
| 5 | 2.7 | 0 | 1.2 | 1193 | 12 | 14316 | 39 | Comparative example |
| 6 | 1.9 | 46 | 1.2 | 950 | 17 | 16150 | 44 | Comparative example |
| 7 | 3.5 | 28 | 1.2 | 967 | 15 | 14505 | 41 | Comparative example |
| 8 | 2.4 | 29 | 1.0 | 1025 | 18 | 18450 | 23 | Invention example |
| 9 | 1.5 | 21 | 1.6 | 1120 | 16 | 17920 | 36 | Invention example |
| 10 | 2.1 | 31 | 1.8 | 1001 | 22 | 22022 | 40 | Invention example |
| 11 | 1.3 | 38 | 1.0 | 1088 | 16 | 17408 | 7 | Invention example |
| 12 | 2.3 | 34 | 1.0 | 1031 | 17 | 17527 | 17 | Invention example |
| 13 | 1.7 | 22 | 1.8 | 1122 | 16 | 17952 | 10 | Invention example |
| 14 | 2.3 | 23 | 1.2 | 905 | 21 | 19005 | 40 | Comparative example |
| 15 | 1.0 | 51 | 1.2 | 1066 | 19 | 20254 | 51 | Comparative example |

TABLE 3-continued

| | | | | | | | | |
|---|---|---|---|---|---|---|---|---|
| 16 | 2.6 | 25 | 1.2 | 1024 | 15 | 15360 | 47 | Comparative example |
| 17 | 1.1 | 28 | 1.2 | 1250 | 11 | 13750 | 48 | Comparative example |
| 18 | 3.2 | 12 | 1.5 | 1096 | 18 | 19728 | 66 | Comparative example |
| 19 | 1.1 | 60 | 1.4 | 1034 | 14 | 14476 | 9 | Comparative example |
| 20 | 1.8 | 43 | 1.4 | 999 | 15 | 14985 | 9 | Comparative example |
| 21 | 1.9 | 39 | 1.4 | 1040 | 17 | 17680 | 9 | Invention example |
| 22 | 2.0 | 21 | 1.0 | 1098 | 18 | 19764 | 14 | Invention example |
| 23 | 2.3 | 36 | 1.0 | 996 | 19 | 18924 | 10 | Invention example |
| 24 | 1.8 | 35 | 1.2 | 1014 | 19 | 19266 | 21 | Invention example |
| 25 | 1.9 | 17 | 1.4 | 1148 | 17 | 19516 | 22 | Invention example |
| 26 | 2.1 | 19 | 1.4 | 1075 | 16 | 17200 | 3 | Invention example |
| 27 | 2.1 | 24 | 1.4 | 1091 | 16 | 17456 | 7 | Invention example |
| 28 | 0.9 | 44 | 1.4 | 1153 | 16 | 18448 | 10 | Invention example |
| 29 | 2.0 | 34 | 1.6 | 1037 | 17 | 17629 | 25 | Invention example |
| 30 | 2.0 | 31 | 1.6 | 1049 | 17 | 17833 | 29 | Invention example |
| 31 | 2.0 | 21 | 1.6 | 1111 | 18 | 19998 | 20 | Invention example |
| 32 | 1.5 | 47 | 1.8 | 1007 | 18 | 18126 | 17 | Invention example |
| 33 | 2.1 | 24 | 1.8 | 1093 | 16 | 17488 | 6 | Invention example |

Underlined: indicates outside of the scope of invention.
*Harder phase: bainitic ferrite, tempered martensite, martensite, and retained austenite

INDUSTRIAL APPLICABILITY

According to aspects of the present invention, it becomes possible to manufacture a high-strength steel sheet that has a TS of 980 MPa or more, has TS×El≥17000 MPa·%, and is excellent in stability of mechanical properties with a TS variation (ΔTS: the maximum TS−the minimum TS) of less than 45 MPa. An improvement in fuel efficiency and an improvement in material yield based on a weight reduction of an automotive body can be achieved by using a high-strength steel sheet obtained in accordance with the manufacturing method according to aspects of the present invention for, for example, an automotive structural member; thus, the industrial utility value is very large.

The invention claimed is:

1. A steel sheet comprising: a chemical composition containing, in mass %,
C: 0.05% to 0.20%,
Si: 0.30% to 2.50%,
Mn: 1.50% to 3.40%,
P: 0.001% to 0.100%,
S: 0.0001% to 0.0200%,
Al: 0.010% to 1.000%,
N: 0.0005% to 0.0100%,
Nb: 0.01% to 0.100%, and the balance including Fe and incidental impurities; and
a steel structure that contains ferrite and a harder phase and in which
the ferrite accounts for 30% to 70% in terms of area ratio, and
the harder phase contains bainitic ferrite, tempered martensite, martensite including 0%, and retained austenite including 0%,
wherein a maximum grain diameter of ferrite $d_{max}$ is 2.5 μm or less, and
an area ratio of ferrite $A_F$ and an average grain diameter of ferrite $d_F$ satisfy $A_F$ [%]/$d_F$[μm]≥15, and
a difference between a maximum tensile strength and a minimum tensile strength measuring in a rolling direction is less than 45 MPa.

2. The steel sheet according to claim 1, wherein the chemical composition further contains, in mass %, at least one or more elements selected from
Ti: 0.100% or less,
V: 0.100% or less,
B: 0.0100% or less,
Mo: 0.50% or less,
Cr: 1.00% or less,
Cu: 1.00% or less,
Ni: 0.50% or less,
As: 0.500% or less,
Sb: 0.200% or less,
Sn: 0.200% or less,
Ta: 0.100% or less,
Ca: 0.0200% or less,
Mg: 0.0200% or less,
Zn: 0.020% or less,
Co: 0.020% or less,
Zr: 0.020% or less, and Rare Earth Metals: 0.0200% or less.

3. The steel sheet according to claim 1, having a zinc-based coating on a surface.

4. The steel sheet according to claim 1, wherein the maximum grain diameter of ferrite $d_{max}$ is 2.4 μm or less.

5. The steel sheet according to claim 2, having a zinc-based coating on a surface.

6. The steel sheet according to claim 3, wherein the zinc-based coating is a hot-dip galvanized coating or a galvannealed coating.

7. The steel sheet according to claim 5, wherein the zinc-based coating is a hot-dip galvanized coating or a galvannealed coating.

8. A method for manufacturing the steel sheet according to claim 1, the method comprising: subjecting a steel slab having the chemical composition to hot rolling, pickling, cold rolling with a maximum value of applied tension of 98 MPa or more, then heating at, as an annealing temperature, 720° C. to a $T_R$ temperature, heat retention in a temperature range of 720° C. to the $T_R$ temperature for 10 s or more, and subsequently cooling down to room temperature at an average cooling rate of 10° C./s or more,
wherein
$T_R$ temperature (° C.)=944−203×[% C]$^{1/2}$+45×[%Si]−30×[% Mn]+150×[% Al]−20 ×[% Cu]+11×[%Cr]+400×[%Ti]
where [%X] means mass % of composition element X of the steel sheet, and is set to 0 (zero) in a case of not containing composition element X.

9. A method for manufacturing the steel sheet according to claim 2, the method comprising: subjecting a steel slab having the chemical composition of claim 2 to hot rolling, pickling, cold rolling with a maximum value of applied tension of 98 MPa or more, then heating at, as an annealing temperature, 720° C. to a $T_R$ temperature, heat retention in a temperature range of 720° C. to the $T_R$ temperature for 10 s or more, and subsequently cooling down to room temperature at an average cooling rate of 10° C./s or more,
wherein $T_R$ temperature (° C.)=944−203×[% C]$^{1/2}$+45×[%Si]−30×[% Mn]+150×[% Al]−20 ×[% Cu]+11×[%Cr]+400×[%Ti]

where [%X] means mass % of composition element X of the steel sheet, and is set to 0 (zero) in a case of not containing composition element X.

10. The method for manufacturing a steel sheet according to claim 8, wherein galvanizing treatment is performed on a surface.

11. The method for manufacturing a steel sheet according to claim 9, wherein galvanizing treatment is performed on a surface.

* * * * *